US012619362B2

(12) United States Patent
Kubota et al.

(10) Patent No.: US 12,619,362 B2
(45) Date of Patent: May 5, 2026

(54) MEMORY SYSTEM AND CONTROL METHOD

(71) Applicant: Kioxia Corporation, Tokyo (JP)

(72) Inventors: Takahiro Kubota, Kawasaki Kanagawa (JP); Hironori Uchikawa, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/432,257

(22) Filed: Feb. 5, 2024

(65) Prior Publication Data

US 2024/0264749 A1     Aug. 8, 2024

(30) Foreign Application Priority Data

Feb. 8, 2023     (JP) .................................. 2023-017630

(51) Int. Cl.
G06F 3/06          (2006.01)

(52) U.S. Cl.
CPC .......... G06F 3/0619 (2013.01); G06F 3/0655 (2013.01); G06F 3/0679 (2013.01)

(58) Field of Classification Search
CPC ..... G06F 3/0619; G06F 3/0655; G06F 3/0679
See application file for complete search history.

(56) References Cited

U.S. PATENT DOCUMENTS 9,391,643 B2      7/2016  Vojcic et al.
9,837,115 B1 *  12/2017  Sridhara ................. G11B 5/012

| 10,193,582 | B2 * | 1/2019 | Lee | ...................... H04B 1/7097 |
| 11,455,209 | B2 | 9/2022 | Kubota et al. | |
| 2014/0155010 | A1 * | 6/2014 | Bhattacharjee | ...... H04B 1/1027 |
| | | | | 455/226.3 |
| 2015/0311921 | A1 * | 10/2015 | Shi | ...................... G06F 11/1012 |
| | | | | 714/755 |
| 2016/0043744 | A1 | 2/2016 | Vojcic et al. | |
| 2017/0187493 | A1 * | 6/2017 | Lincoln | ................. H04L 1/0038 |
| 2018/0219561 | A1 * | 8/2018 | Litsyn | ............... H03M 13/2915 |
| 2018/0278273 | A1 * | 9/2018 | Kifune | .............. H03M 13/2948 |
| 2018/0302262 | A1 * | 10/2018 | Fontaine | ............. H04L 27/3411 |
| 2019/0087107 | A1 * | 3/2019 | Watanabe | ......... H03M 13/2909 |
| 2019/0286517 | A1 * | 9/2019 | Watanabe | ......... H03M 13/3707 |
| 2020/0091941 | A1 * | 3/2020 | Watanabe | ........... G06F 11/1068 |
| 2021/0351796 | A1 * | 11/2021 | Fujimori | ........... H03M 13/3707 |
| 2022/0261312 | A1 | 8/2022 | Kubota et al. | |
| 2023/0034299 | A1 * | 2/2023 | Jang | ................. H03M 13/6362 |

FOREIGN PATENT DOCUMENTS

WO      WO-2020/115874 A1      6/2020

* cited by examiner

*Primary Examiner* — Albert Decady
*Assistant Examiner* — Osman M Alshack
(74) *Attorney, Agent, or Firm* — Foley & Lardner LLP

(57)          ABSTRACT

A memory system includes a non-volatile memory configured to store an error correction codes and a memory controller. The memory controller is configured to obtain read information from the non-volatile memory, perform a first decoding process on the read information to output a plurality of decoding results respectively corresponding to a plurality of elements provided in the read information, perform a cancellation process for returning the decoding results satisfying a condition among the plurality of decoding results to values prior to decoding in response to the first decoding process being not successful, and perform a second decoding process using the plurality of decoding results after performing the cancelation process.

12 Claims, 11 Drawing Sheets

*FIG. 12*

CANCELLATION OF MAXIMUM LIKELIHOOD DECODED WORD IN COLUMN 2

DECODER

181

HIHO DECODING
UNIT 182-2

SISO DECODING
UNIT

183

RESIDUAL ERROR
REMOVAL UNIT

*FIG. 14*

| (RECEIVED VALUE) → (POSTERIOR VALUE) | 1 → 3 | 9 → 9 | −9 → −3 | 3 → −1 | | 3 → 5 | 9 → 5 |
|---|---|---|---|---|---|---|---|
| (POSTERIOR VALUE HARD DECISION VALUE) | 0 | 0 | 1 | 1 | | 0 | 0 |
| (VALUE AFTER CANCELLATION PROCESSING) | 0 | 0 | 1 | 0 | | 0 | 0 |
| (VALUE AFTER RESIDUAL ERROR REMOVAL PROCESSING) | 0 | 0 | 0 | 0 | | 0 | 0 |

MEMORY SYSTEM AND CONTROL METHOD

CROSS-REFERENCE TO RELATED APPLICATION

This application is based upon and claims the benefit of priority from Japanese Patent Application No. 2023-017630, filed Feb. 8, 2023, the entire contents of which are incorporated herein by reference.

FIELD

Embodiments described herein relate generally to a memory system and a control method.

BACKGROUND

In a memory system, data subjected to error correction coding is generally stored in order to protect data to be stored. For this reason, when data stored in the memory system is read, decoding is performed on the data subjected to error correction coding.

DESCRIPTION OF THE DRAWINGS

FIG. 12 is a diagram showing an example in which a syndrome value of a component code remains in an unsatisfied state.

FIG. 13 is a block diagram of a decoder according to a second embodiment.

FIG. 14 is a diagram showing cancellation processing.

DETAILED DESCRIPTION

Embodiments provide a memory system and a control method which are capable of executing error correction (decoding) with higher accuracy.

In general, according to one embodiment, a memory system includes a non-volatile memory configured to store an error correction codes and a memory controller. The memory controller is configured to obtain read information having a plurality of read elements from the non-volatile memory, perform a first decoding process on the read information to output a plurality of decoding results respectively corresponding to the plurality of elements, perform a cancellation process for returning the decoding results satisfying a condition among the plurality of decoding results to values prior to decoding in response to the first decoding process being not successful, and perform, after performing the cancellation process, a second decoding process using the plurality of decoding results.

A memory system according to an embodiment will be described in detail below with reference to the accompanying drawings. The present disclosure is not limited to the following embodiments.

In recent years, memory systems using non-volatile memories such as a NAND flash memory (hereinafter simply referred to as a NAND memory) have been used in various places due to their high speed characteristics. However, data read from the non-volatile memory is likely to include errors caused by an elapsed time since the data is stored in the non-volatile memory, noise generated during reading/writing, or the like. For this reason, in general, data stored in the non-volatile memory is encoded using an error correction code, and the data is decoded using the error correction code at the time of reading, thereby removing errors provided in the read data.

Figure 1:
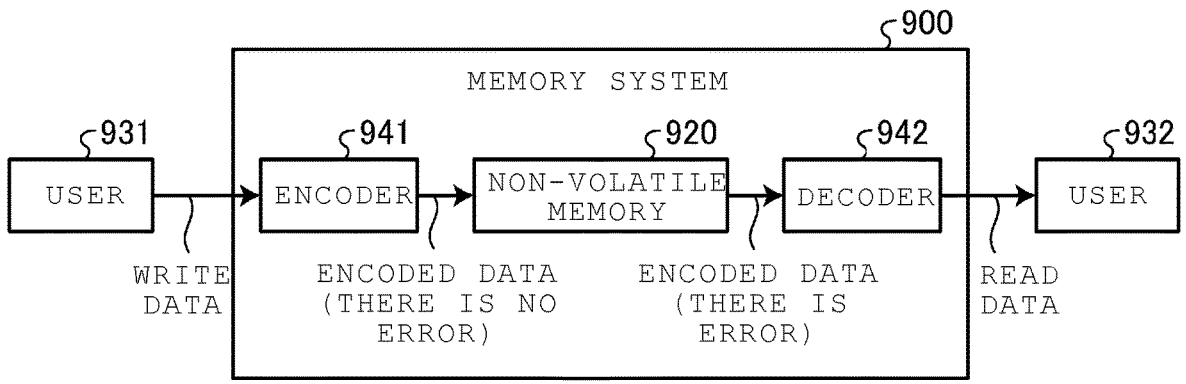
FIG. 1 is a diagram showing an operation of protecting data with an error correction code.

FIG. 1 is a diagram showing an operation of protecting data with an error correction code in a memory system according to a comparative example. A user 931 and a user 932 may each be an information processing device such as a personal computer, a server device, a portable information apparatus, a digital still camera, or the like.

The user 931 transmits data to be written (hereinafter referred to as write data) to a memory system 900. The memory system 900 encodes the write data received from the user 931 using an encoder 941, and writes the encoded data (code word) generated thereby to a non-volatile memory 920. Thus, the encoded data written to the non-volatile memory 920 does not basically include an error.

The encoded data stored in the non-volatile memory 920 is read in response to, for example, a read request from the user 932. Here, there is a possibility that the read encoded data will include an error. Consequently, decoding is executed while removing the error provided in the read encoded data using a decoder 942, thereby restoring the original code word. Thereafter, the original code word or the restored write data before encoding is transmitted to the user 932. The user 932 that issues the read request may be the same user as the user 931 who issues the write request, or may be a different user.

Here, a case is assumed in which the encoder 941 encodes the write data into a code word configured with binary information (bits) expressed as '0' or '1', and the code word is stored in the non-volatile memory 920 as binary information. Hereinafter, when stored data is read as binary information indicating whether the data is '0' or '1' and is then input to the decoder 942 at the time of reading the data from the non-volatile memory 920, the input information will be referred to as a hard decision input (hard-input). On the other hand, when the stored data is read as s information regarding on the probability of being '0' or the probability of being '1' and is then input to the decoder 942, the probability information will be referred to as a soft decision input (soft-input).

When a decoding result output by the decoder 942 is binary information indicating whether the original write data is '0' or '1', the output information will be referred to as a hard decision output (hard-output). On the other hand, when the decoding result output by the decoder 942 includes probability information indicating whether the original write data is '0' or '1', the output information will be referred to as a soft decision output (soft-output).

A soft-input/soft-output (SISO) decoder that receives such a soft decision input and produces a soft decision output is used as, for example, a component code decoder for a multidimensional error correction code.

Here, the multidimensional error correction code refers to one in which a symbol, which is at least one or more units of an error correction code, is protected in a multiple manner by a plurality of smaller component codes. One symbol is configured with, for example, one bit (an element of a binary field) or an element of an alphabet such as a finite field other than a binary field. For ease of description, a binary error correction code in which one symbol is configured with one bit will be described below as an example. There may be a location in the description where symbols and bits are mixed together, but they both mean the same thing.

Figure 2:
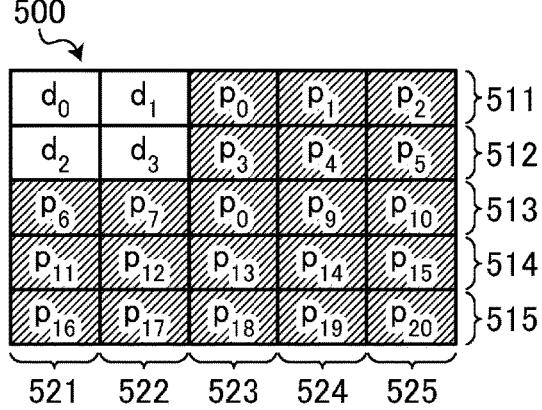
FIG. 2 is a diagram showing an example of a product code.

A product code is shown in FIG. 2 as an example of a multidimensional error correction code. A product code 500 shown in FIG. 2 has a structure in which information symbols d0 to d3, which are units, are protected by hamming codes 511 to 515 and 521 to 525 having an information length of two symbols and a parity length of three symbols, respectively, in a row direction (horizontal direction in the drawing) and a column direction (vertical direction in the drawing). In such a product code 500, all of the information symbols d0 to d3 and parity symbols p0 to p20 are doubly protected by hamming codes in the row direction and hamming codes in the column direction. In the product code shown in FIG. 2, all symbols are doubly protected by component codes in the row direction (referred to as a dimension 1) and in the column direction (referred to as a dimension 2). The multidimensional error correction code is not limited thereto, and may be, for example, a generalized low density parity check (LDPC) code. In general multidimensional error correction codes including generalized LDPC codes, the multiplicity of protection may differ for each symbol, and component codes cannot be grouped into a dimension 1 and a dimension 2. However, the present technology can also be applied to such code configurations.

Hereinafter, for the sake of simplicity, description will be given of an example in which a two-dimensional error correction code is used such that each symbol is protected by two component codes capable of being grouped into a dimension 1 and a dimension 2. Each of component codes of each dimension includes one or more component codes determined for each dimension. Hereinafter, component codes corresponding to each dimension, including one or more component codes, may be referred to as a component code group. For example, a component code group of a dimension 1 and a component code group of a dimension 2 each include n1 component codes and n2 component codes. Applicable error correction codes are not limited thereto, and may be N-dimensional error correction codes in which at least one symbol among symbols constituting a code is protected by N component code groups (N is an integer of 2 or more). When expressed by the number of component codes provided in each component code group, N-dimensional error correction codes are protected by M component codes (M is the sum of ni ($1 \leq i \leq N$), N is an integer of 2 or more, and ni is the number of component codes of an i-th dimension).

Figure 3:
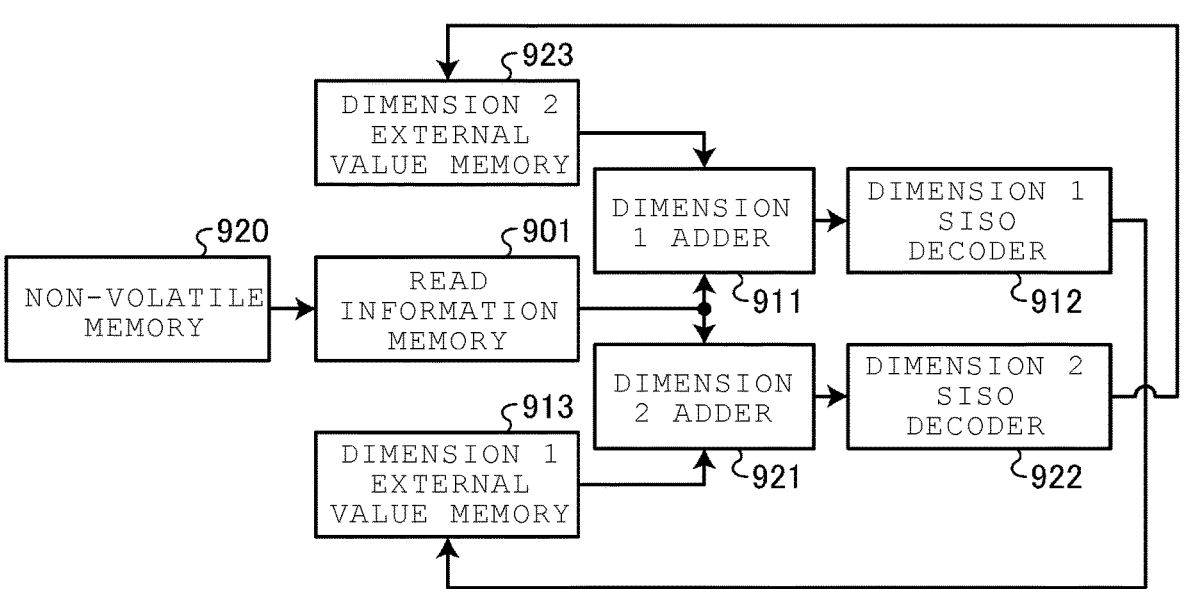
FIG. 3 is a block diagram showing an example of functional blocks that execute turbo decoding on a two-dimensional error correction code.
Figure 4:
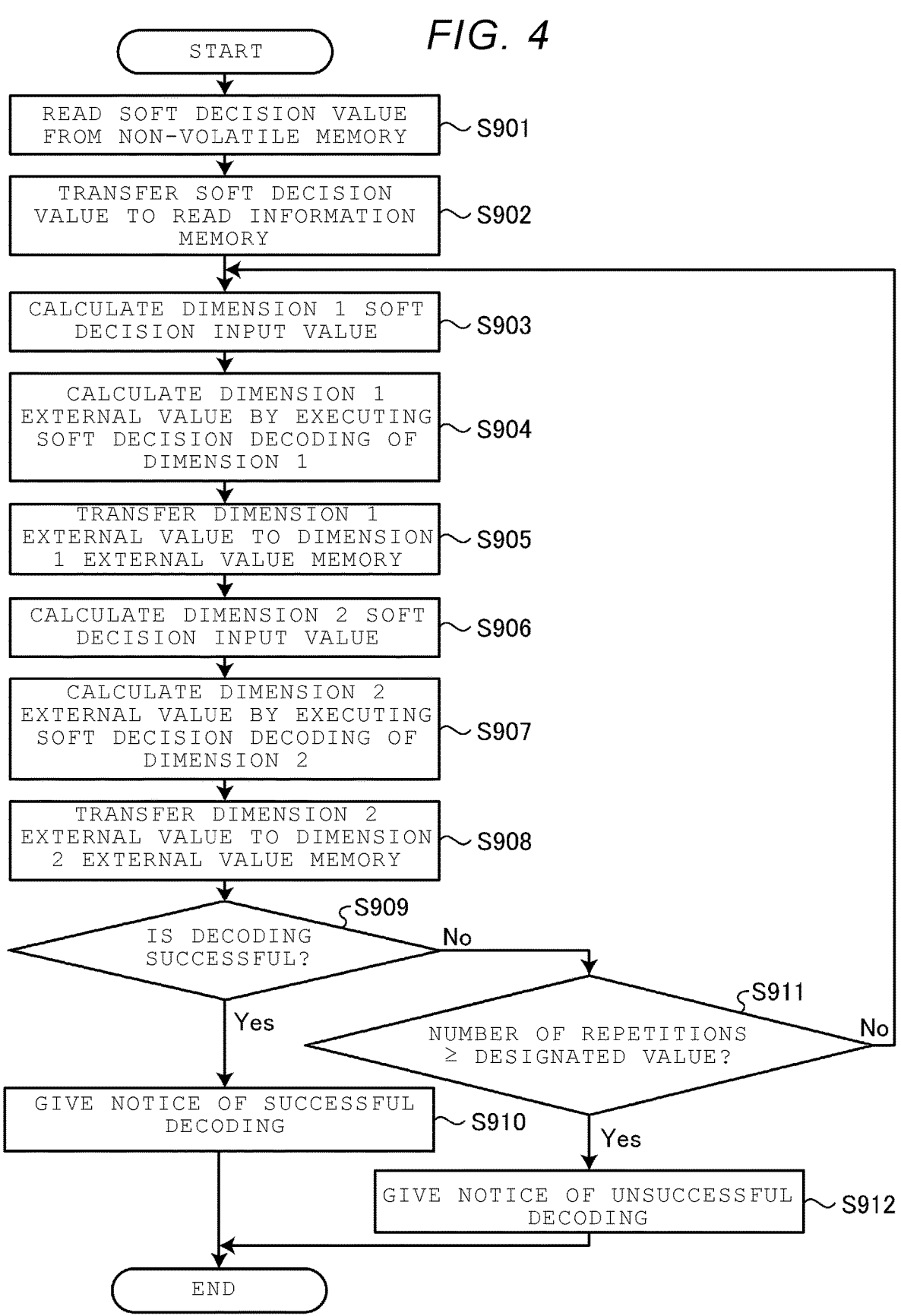
FIG. 4 is a flowchart of a processing flow according to the functional blocks shown in FIG. 3.

Turbo decoding can be performed on such multidimensional error correction codes. FIG. 3 is a diagram showing an example of functional blocks that execute turbo decoding on a two-dimensional error correction code. FIG. 4 is a flowchart showing an example of a processing flow according to the functional blocks shown in FIG. 3.

As shown in FIG. 3, the functional blocks that execute turbo decoding on a two-dimensional error correction code include a read information memory 901, a dimension 1 adder 911, a dimension 1 SISO decoder 912, a dimension 1 external value memory 913, a dimension 2 adder 921, a dimension 2 SISO decoder 922, and a dimension 2 external value memory 923.

In a turbo decoding operation using such functional blocks, as shown in FIG. 4, first, an error correction code is read from the non-volatile memory 920 as a soft decision value (step S901). The error correction code of the read soft decision value is transferred to and stored in the read information memory 901 as read information (step S902).

Next, the read information in the read information memory 901 and the dimension 2 external value in the dimension 2 external value memory 923 are added by the dimension 1 adder 911, whereby a dimension 1 soft decision input value (=read information+dimension 2 external value) is calculated (step S903). It is assumed that both the dimension 1 external value memory 913 and the dimension 2 external value memory 923 are reset (zero cleared) at the time of starting this operation.

Next, the dimension 1 soft decision input value calculated by the dimension 1 adder 911 is input to the dimension 1 SISO decoder 912 for each component code. The dimension 1 SISO decoder 912 calculates a dimension 1 external value by performing soft decision decoding of the dimension 1 on the input dimension 1 soft decision input value (step S904). The calculated dimension 1 external value is transferred to and stored in the dimension 1 external value memory 913 (step S905).

Next, the read information in the read information memory 901 and the dimension 1 external value in the dimension 1 external value memory 913 are added by the dimension 2 adder 921, whereby a dimension 2 soft decision input value (=read information+dimension 1 external value) is calculated (step S906).

Next, the dimension 2 soft decision input value calculated by the dimension 2 adder 921 is input to the dimension 2 SISO decoder 922 for each component code. The dimension 2 SISO decoder 922 calculates a dimension 2 external value by performing soft decision decoding of the dimension 2 on the input dimension 2 soft decision input value (step S907). The calculated dimension 2 external value is transferred to and stored in the dimension 2 external value memory 923 (step S908).

Next, it is determined whether the decoding is successful (step S909). Successful decoding may mean, for example, that a decoded word that can be determined to be correct is found. When the decoding is successful (YES in step S909), an external control unit or the like is notified of the successful decoding and the found decoded word (step S910), and this operation is terminated. On the other hand, when the decoding is not successful (NO in step S909), it is determined whether the number of repetitions of this operation reaches a designated value which is set in advance (step S911), and when it is determined whether the number of repetitions of this operation reaches the designated value (NO in step S911), the processing returns to step S903 and the subsequent operations are executed. When the number of repetitions of this operation reaches the designated value (YES in step S911), the external control unit or the like is notified of a failure in the decoding (step S912), and this operation is terminated. The number of repetitions may be, for example, the number of times the operations of steps S903 to S908 in FIG. 4 are repeated.

For the dimension 1 SISO decoder 912 and the dimension 2 SISO decoder 922 in the configuration shown in FIG. 3, a Max-log-MAP (Maximum A Posteriori) decoder that adopts a decoding algorithm for calculating an external value can be used. The Max-log-MAP decoder is a decoder that calculates a posterior probability value for each bit from a MAP decoded word and an opposite decoded word for each bit. For simplicity of description, hereinafter, a quantity proportional the posterior probability and its approximate value will also be referred to as a posterior probability. For example, when it is assumed that prior probabilities of all code words are equal, the likelihood of a decoded word is an amount proportional to a posterior probability value of the decoded word.

Here, a MAP decoded word $c^*$ indicates a code word $c^*=\mathrm{argmax}cP$ (c|S) with the highest posterior probability P calculated from a soft decision input value S among all code words c∈C. An opposite decoded word of an i-th bit indicates a code word $c_{p,i}=\mathrm{argmax}cP$ (c|S, $c_i{\neq}c^*_i$) with the highest posterior probability P calculated from the soft decision input value S among code words having different values from the MAP decoded word $c^*$ in the i-th bit. Thus, an intermediate hard decision value calculated in the middle of decoding in the Max-log-MAP decoder includes the MAP decoded word $c^*$ and all opposite code words $c_{p,i}$.

A set $C' \subset C$ of code words with a relatively high posterior probability may be used instead of a set C of all code words. In that case, an approximate MAP decoded word and an approximate opposite decoded word of the i-th bit are obtained. Although Max-log-MAP decoding using a subset C' of such code words has inferior correction ability compared to Max-log-MAP decoding using the set C of all code words, it reduces the amount of calculation. Thus, it has a characteristic of being able to perform decoding at high speed. For simplicity of description, even an approximate MAP decoded word to be used will also be hereinafter referred to as a MAP decoded word.

In Max-log-MAP decoding using a subset C' of code words, a logarithmic posterior probability ratio R of the i-th bit is approximately calculated using the following Equation (1) from the MAP decoded word $c^*$ and the posterior probability ratio of the opposite decoded word $c_{p,i}$.

$$R = (1 - 2c_i)\ln\left(\frac{P(c^* \mid S)}{P(c_{p,i} \mid S)}\right) \qquad (1)$$

An external value of each dimension can be obtained by subtracting a soft decision input value Si of each dimension from the logarithmic posterior probability ratio R obtained by Equation (1). In this description, Max-log-MAP decoding is used as an example of a decoding algorithm for calculating an external value from an intermediate hard decision value calculated in the middle of decoding, but various other decoding algorithms may also be used.

In turbo decoding, for example, aggressive decoding may be performed with the aim of correcting errors in more bits, based on a reliability estimated for a decoding result for each component code. However, in such decoding, multiple bits of error correction occur, and consequently, residual error removal processing after turbo decoding does not work effectively, and an error correction (decoding) ability (for example, error floor performance) may deteriorate. The residual error removal processing is processing for correcting remaining errors (residual errors) using a method different from turbo decoding when the turbo decoding is not successful.

In the following embodiment, cancellation processing for returning a decoding result satisfying predetermined conditions among a plurality of decoding results to a value before decoding is executed. Thereby, for example, it is possible to cancel a decoding result that is an erroneous correction and to improve the accuracy of error correction.

First Embodiment

Figure 5:
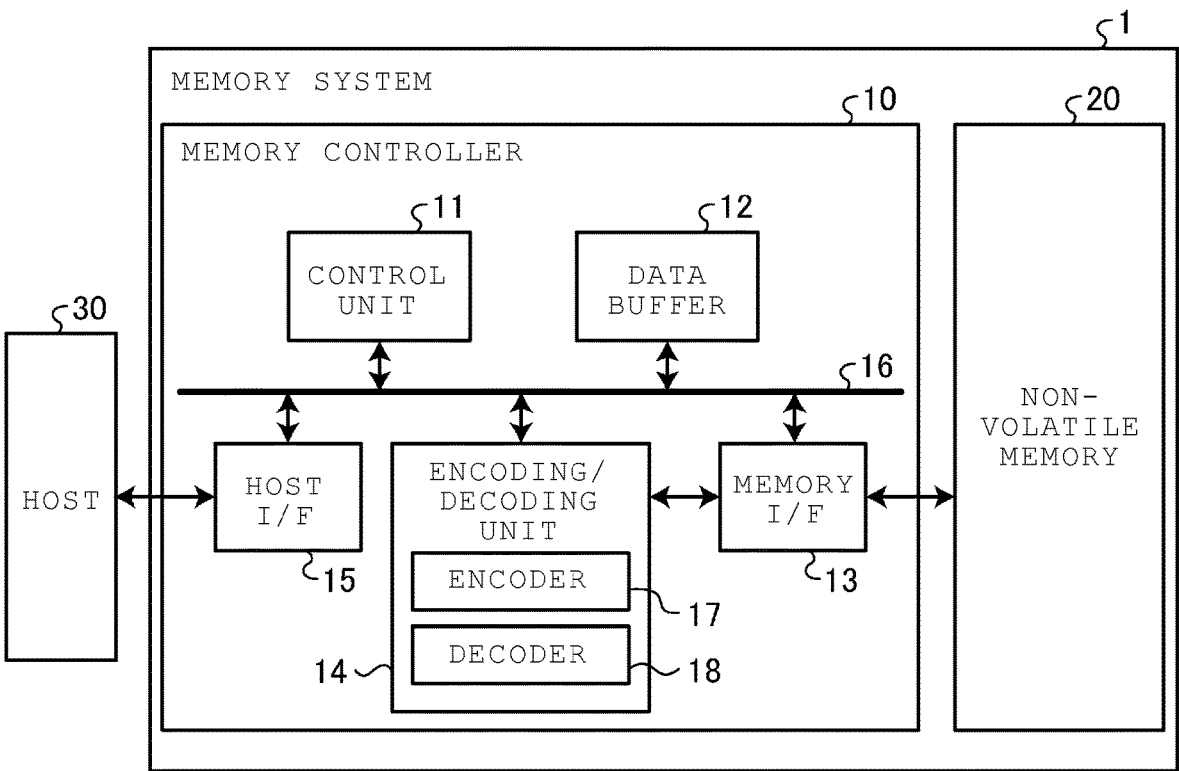
FIG. 5 is a block diagram of a memory system according to a first embodiment.

FIG. 5 is a block diagram showing an example of a schematic configuration of a memory system according to a first embodiment. As shown in FIG. 5, a memory system 1 includes a memory controller 10 and a non-volatile memory 20. The memory system 1 can be connected to a host 30, and a state where the memory system 1 is connected to the host 30 is shown in FIG. 5. The host 30 may be, for example, electronic equipment such as a personal computer or a mobile terminal.

The non-volatile memory 20 is a non-volatile memory that stores data in a non-volatile manner, and is, for example, a NAND memory. In the following description, a case where a NAND memory is used as the non-volatile memory 20 will be exemplified, but storage devices other than a NAND memory, such as a three-dimensional structure flash memory, a resistance random access memory (ReRAM), and a ferroelectric random access memory (FeRAM), may also be used as the non-volatile memory 20. It is not essential that the non-volatile memory 20 be a semiconductor memory, and the present embodiment may also be applied to various storage media other than a semiconductor memory.

The memory system 1 may be a memory card or the like in which the memory controller 10 and the non-volatile memory 20 are configured as one package, or may be a solid state drive (SSD) or the like.

The memory controller 10 controls writing to the non-volatile memory 20 in response to a write request received from the host 30. The memory controller 10 controls reading from the non-volatile memory 20 in response to a read request received from the host 30. The memory controller 10 includes a host I/F (host interface) 15, a memory I/F (memory interface) 13, a control unit 11, an encoding/decoding unit (codec) 14, and a data buffer 12. The host I/F 15, the memory I/F 13, the control unit 11, the encoding/decoding unit 14, and the data buffer 12 are connected to each other by an internal bus 16.

The host I/F 15 performs processing according to an interface standard between the host I/F 15 and the host 30 and outputs commands received from the host 30, user data to be written, etc. to the internal bus 16. The host I/F 15 transmits user data read and restored from the non-volatile memory 20, a response received from the control unit 11, and the like to the host 30.

The memory I/F 13 performs write processing to the non-volatile memory 20 based on an instruction of the control unit 11. The memory I/F 13 performs read processing from the non-volatile memory 20 based on an instruction received from the control unit 11.

The control unit 11 comprehensively controls the components of the memory system 1. When the control unit 11 receives a command from the host 30 via the host I/F 15, the control unit 11 performs control according to the command. For example, the control unit 11 instructs the memory I/F 13 to write user data and parities to the non-volatile memory 20 in response to a command received from the host 30. The control unit 11 instructs the memory I/F 13 to read user data and a parity from the non-volatile memory 20 in response to a command received from the host 30.

Furthermore, when the control unit 11 receives a write request for user data from the host 30, the control unit 11 accumulates the user data in the data buffer 12 and determines a storage area (memory area) in the non-volatile memory 20 for the user data. That is, the control unit 11 manages a write destination of the user data. Correspondence between a logical address of the user data received from the host 30 and a physical address indicating the storage area on the non-volatile memory 20 where the user data is stored is stored as an address conversion table.

When the control unit 11 receives a read request from the host 30, the control 1 converts a logical address designated by the read request into a physical address using the above-mentioned address conversion table and instructs the memory I/F 13 to perform reading from the physical address.

In a NAND memory, writing and reading are generally performed in units of data referred to as a page, and erasing is performed in units of data referred to as a block. In the present embodiment, a plurality of memory cells connected to the same word line are referred to as a memory cell group. When the memory cells are single level cells (SLC), one memory cell group corresponds to one page. When the memory cells are multi-level cells (MLC), one memory cell group corresponds to a plurality of pages. The memory cells are connected to a word line and also connected to a bit line. Thus, the memory cells can be identified by an address for identifying the word line and an address for identifying the bit line.

The data buffer 12 temporarily stores user data received from the host 30 by the memory controller 10 before the user data is stored in the non-volatile memory 20. The data buffer 12 temporarily stores user data read from the non-volatile memory 20 before the user data is transmitted to the host 30. For the data buffer 12, for example, a general-purpose memory such as a static random access memory (SRAM) or a dynamic random access memory (DRAM) may be used.

The user data transmitted from the host 30 is transferred to the internal bus 16 and temporarily stored in the data buffer 12. The encoding/decoding unit 14 encodes the user data to generate code words. The encoding/decoding unit 14 decodes the received words read from the non-volatile memory 20 to restore the user data. Consequently, the encoding/decoding unit 14 includes an encoder 17 and a decoder 18. The data encoded by the encoding/decoding unit 14 may include control data used in the memory controller 10, and the like in addition to the user data.

Next, write processing in the present embodiment will be described. The control unit 11 instructs the encoder 17 to encode user data when the user data is written to the non-volatile memory 20. At this time, the control unit 11 determines a storage location (storage address) of a code word in the non-volatile memory 20 and also gives an instruction on the determined storage location to the memory I/F 13.

The encoder 17 encodes user data on the data buffer 12 to generate code words based on an instruction received from the control unit 11. As an encoding method, for example, an encoding method using a Bose-Chandhuri-Hocquenghem (BCH) code or a Reed-Solomon (RS) code may be adopted. The code words generated by the encoder 17 are multidimensional error correction codes such as the product code 500 exemplified above using FIG. 2. As described above, the product code 500 shown in FIG. 2 has a structure in which information bits (may be symbols) do to d3, which are units, are protected by the component codes 511 to 515 and 521 to 525, which are hamming codes having an information length of 2 bits and a parity length of 3 bits, in a row direction (horizontal direction in the drawing) and a column direction (vertical direction in the drawing). In such a product code 500, all of the information bits do to d3 and the parity bits p0 to p20 are doubly protected by component codes (hamming codes) 511 to 515 in the row direction and component codes (hamming codes) 521 to 525 in the column direction. The memory I/F 13 performs control of storing a code word in the storage location on the non-volatile memory 20 which is instructed by the control unit 11.

Figure 6:
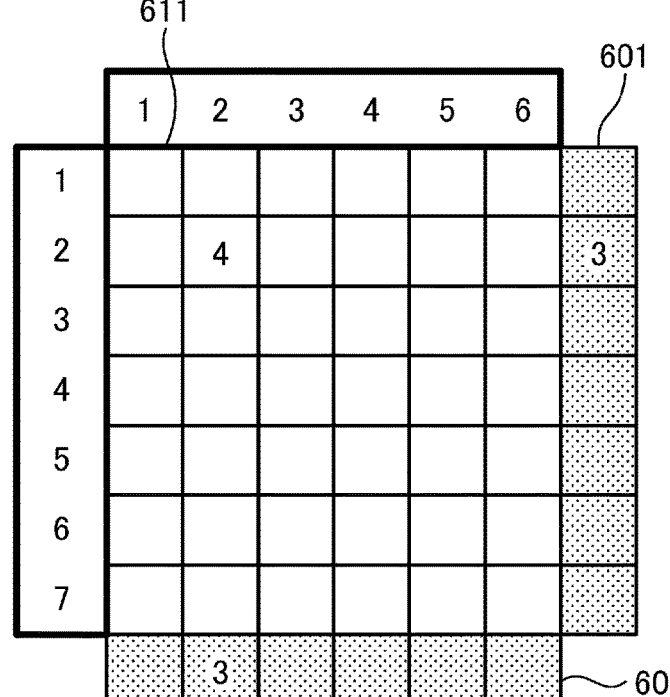
FIG. 6 is a diagram showing an example of an outer code and an inner code.

In the present embodiment, the encoder 17 encodes a code (hereinafter referred to as an outer code) used in residual error removal processing before encoding using a product code, which is an inner code. Examples of the outer code and the inner code will be described using FIG. 6. In FIG. 6 and the subsequent drawings, a product code in which 6 bits (columns 1 to 6) of information bits are encoded in the column direction and 7 bits (rows 1 to 7) of information bits are encoded in the row direction will be described as an example.

As shown in FIG. 6, in the present embodiment, a protection area 611 including information bits located in 7 rows and 6 columns is protected by a parity 601 and a parity 602. User data provided in the protection area 611 is protected by outer codes provided in the protection area 611. Numerical values (1 to 7) on the left of the protection area 611 are values for identifying rows, and numerical values (1 to 6) above the protection area 611 are values for identifying columns. The protection area 611 includes user data and parities of outer codes. In the data (information bits) in the protection area 611, the information bits in the row direction are protected by the parity 601, and the information bits in the column direction are protected by the parity 602.

The outer code may be any code, but the outer code is used in the residual error removal processing, and thus can be a code for which it is assumed that there are few remaining errors. For example, the outer code is a 3-bit correctable BCH code. That is, the encoder 17 generates a code word encoded by, for example, a BCH code as a code word to be stored in the protection area 611.

The numerical values in the parities 601 and 602 and the protection area 611 in FIG. 6 represent the number of errors provided in a component code. In the example of FIG. 6, the protection area 611 includes four errors. Thus, when a 3-bit correctable BCH code is used as an outer code, error correction (residual error removal) using the outer code is not successful in the state shown in FIG. 6.

Next, processing when performing reading from the non-volatile memory 20 according to the present embodiment will be described. When performing reading from the non-volatile memory 20, the control unit 11 designates an address on the non-volatile memory 20 and instructs the memory I/F 13 to perform reading. The control unit 11 instructs the decoder 18 to start decoding. The memory I/F 13 reads a received word from the designated address of the non-volatile memory 20 in response to the instruction received from the control unit 11, and inputs the read received word to the decoder 18. The decoder 18 decodes the received word read from the non-volatile memory 20.

Figure 7:
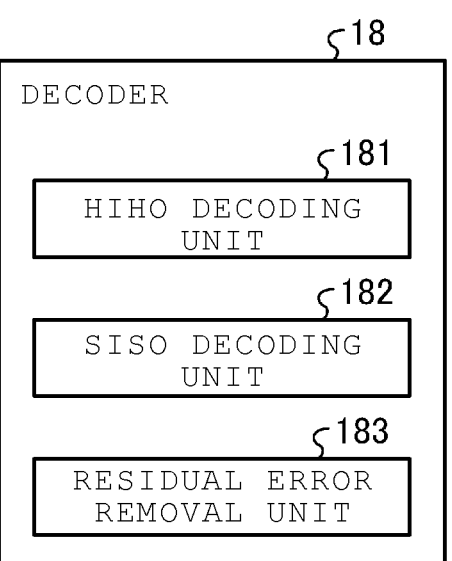
FIG. 7 is a block diagram of a decoder according to the first embodiment.

The decoder 18 decodes the received word read from the non-volatile memory 20. FIG. 7 is a block diagram showing an example of a schematic configuration of the decoder 18. The decoder 18 includes a hard-input hard-output (HIHO) decoding unit 181 that executes decoding using a hard decision value as an input and outputs a hard decision value as a result, and a soft-input soft-output (SISO) decoding unit 182 that executes decoding using a soft decision value as an input and outputs a soft decision value as a result.

In general, SISO decoding is characterized by a higher error correction ability than that of HIHO decoding, but is characterized by a longer processing time. Consequently, in the present embodiment, first, the HIHO decoding unit 181 is configured to perform HIHO decoding on the received word read as a hard decision value from the non-volatile memory 20 and to read the received word that cannot be decoded by hard decision decoding as a soft decision value. The SISO decoding unit 182 is configured to perform SISO decoding on the received word read out as a soft decision value. However, the embodiment is not limited to such a configuration, and various modifications, such as a configuration in which HIHO decoding is omitted and SISO decoding is performed on all received words, may be made.

The decoder 18 includes a residual error removal unit 183. The residual error removal unit 183 executes residual error removal processing (an example of second decoding processing) based on a final decoding result (output decoded word) of decoding processing (an example of first decoding processing) performed by the SISO decoding unit 182. For example, when a 3-bit correctable BCH code is used as an outer code, the residual error removal unit 183 executes bounded distance decoding on the BCH code as residual error removal processing. The final decoding result is stored, for example, in a read information memory 201 (described later) in the decoder 18 or a hard bit memory (HMEM) in the read information memory 201. The residual error removal unit 183 executes residual error removal processing using a decoding result stored in such a memory.

The residual error removal processing is not limited to bounded distance decoding for a BCH code, but may be any decoding processing as long as it is decoding processing suitable for removing residual errors. For example, the residual error removal processing may be iterative decoding for a plurality of component codes.

Figure 8:
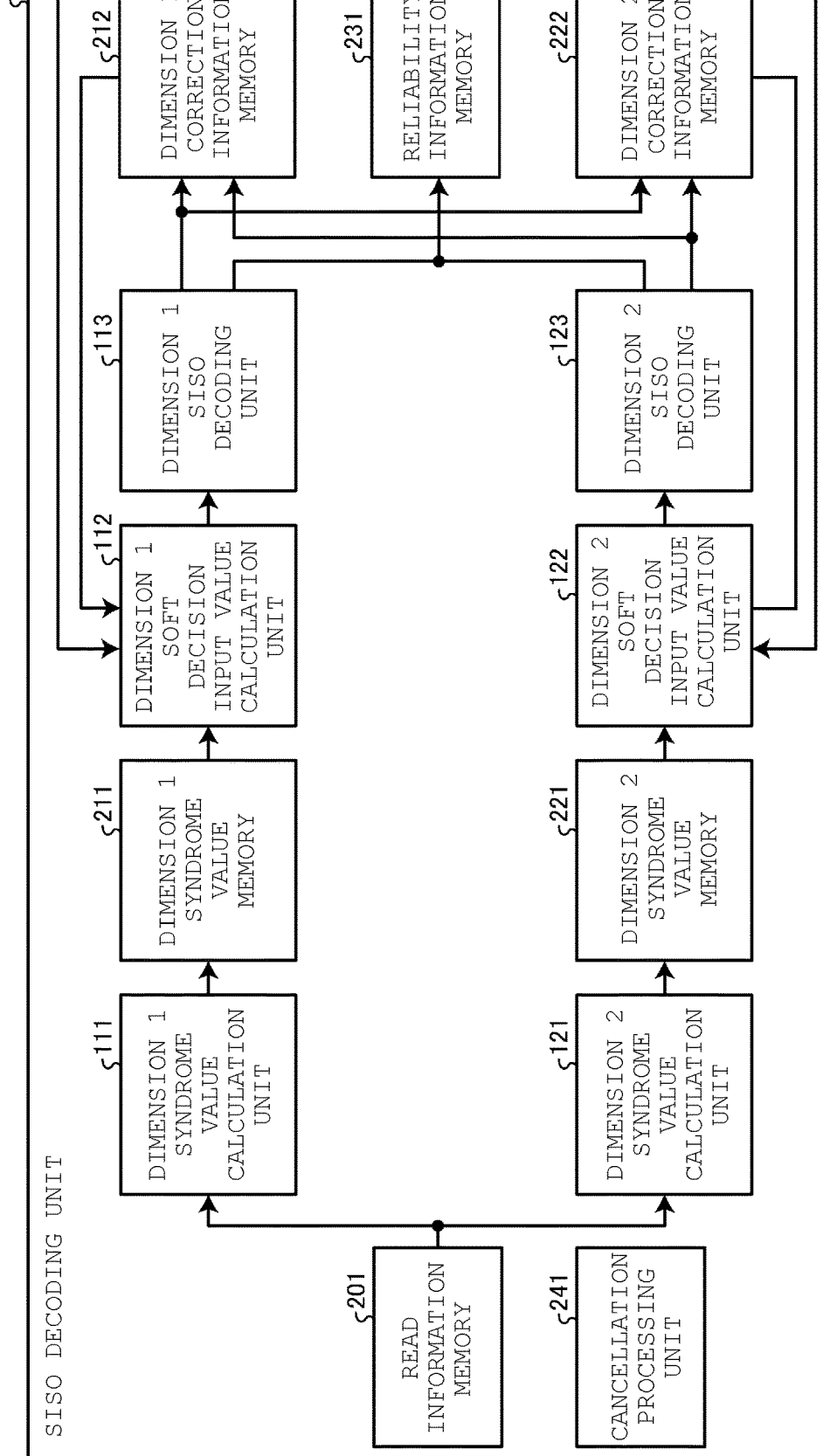
FIG. 8 is a block diagram of a SISO decoding unit according to the first embodiment.

Next, a more detailed configuration of the SISO decoding unit 182 shown in FIG. 7 will be described in detail with reference to the drawings. FIG. 8 is a block diagram showing an example of a schematic configuration of the SISO decoding unit 182.

In the present embodiment, a case where data stored in the non-volatile memory 20 is data encoded using a two-dimensional error correction code will be described as an example. The data stored in the non-volatile memory 20 may be data encoded using a multidimensional error correction code other than a two-dimensional error correction code.

As shown in FIG. 8, the SISO decoding unit 182 includes the read information memory 201, a dimension 1 syndrome value calculation unit 111, a dimension 1 syndrome value memory 211, a dimension 1 soft decision input value calculation unit 112, a dimension 1 SISO decoding unit 113, a dimension 1 correction information memory 212, a dimension 2 syndrome value calculation unit 121, a dimension 2 syndrome value memory 221, a dimension 2 soft decision input value calculation unit 122, a dimension 2 SISO decoding unit 123, a dimension 2 correction information memory 222, a reliability information memory 231, and a cancellation processing unit 241.

The read information memory 201 stores read information read out from the non-volatile memory 20 by soft decision. Among the read information, data corresponding to a hard decision value, which is binary information for determining whether each bit is 0 or 1, may be referred to as hard bit data.

Data corresponding to a portion of the read information excluding the hard bit data may be referred to as soft bit data. The read information memory 201 may include a hard bit memory (HMEM) that stores hard bit data and a soft bit memory (CMEM) that stores soft bit data.

Although the number of pieces of soft bit data (X) may be set in any manner, an example in which one piece of soft bit data SB1 (X=1) is used will be mainly described below. The CMEM may further store not only soft bit data but also hard bit data. The value of the hard bit data stored in the HMEM may be updated during decoding processing. On the other hand, when the CMEM stores not only soft bit data but also hard bit data, the value of the hard bit data stored in the CMEM is not updated during decoding processing. That is, the hard bit data stored in the CMEM is read-only data.

In the decoding processing (for example, calculation of a soft decision input value), data referred to as a channel value may be required. The channel value indicates a value of a log-likelihood ratio (LLR) corresponding to a set of hard bit data and soft bit data. The channel value may be referred to as a channel value LLR. The channel value is determined, for example, by an LLR table in which a set of hard bit data and soft bit data is associated with a channel value.

In the present embodiment in which a symbol is an element of a binary field, the LLR represents probability information regarding whether a certain bit is 0 or 1. In the following, it is assumed that a LLR has a positive value when the probability of a bit being 0 is high, and has a negative value when the probability of a bit being 1 is high. In the present embodiment, it is assumed that a soft decision input value to be calculated is also expressed by an LLR.

The LLR can be represented by being condensed into binary information of 0 or 1 depending on whether it has a positive value or a negative value. In the following, such binary information may be referred to as a hard decision value of an LLR. In the following, a hard decision value is set to 0 when the LLR has a positive value, a hard decision value is set to 1 when the LLR has a negative value, and a hard decision value is determined in accordance with a predetermined rule (for example, a hard decision value is set to 0) when the LLR is 0.

"Hard decision value of channel value" is equivalent to information in which a channel value represented by an LLR is expressed as a binary value depending on the positive or negative of the value as described above. Similarly, the "hard decision value of the soft decision input value" corresponds to information in which the soft decision input value represented by LLR is expressed as a binary value depending on whether the channel value is positive or negative as described above.

As described above, the value of hard bit data stored in the HMEM may be updated during decoding processing. On the other hand, a channel value means a value corresponding to hard bit data immediately after being set in the HMEM (hard bit data before updating). For example, in a configuration in which data in the HMEM is updated during decoding processing, a sign of a channel value can be obtained during the decoding processing when hard bit data is stored in the CMEM (and is not updated during the decoding processing). The sign of the channel value is referred to, for example, when a syndrome value is corrected, as will be described later. The sign of the channel value corresponds to whether the value of the hard bit data is 0 or 1.

In the present embodiment, the non-volatile memory 20 stores data encoded using a two-dimensional error correction code. The hard bit data stored in the read information memory 201 may be data in which a portion of the data encoded using the two-dimensional error correction code changes to a different value due to an error occurring on the non-volatile memory 20. The read information memory 201 outputs hard bit data to the dimension 1 syndrome value calculation unit 111 and the dimension 2 syndrome value calculation unit 121.

The dimension 1 syndrome value calculation unit 111 calculates a syndrome value (dimension 1 syndrome value) of a component code (an example of a first component code) of a dimension 1. The syndrome value is a symbol string used to calculate an error position by an error correction code and is obtained, for example, by multiplying a parity check matrix of the error correction code by hard bit data. The dimension 1 syndrome value calculation unit 111 may obtain a syndrome value by calculation simpler than matrix calculation by using the structure of the error correction code. The dimension 1 syndrome value obtained by the dimension 1 syndrome value calculation unit 111 is output to the dimension 1 syndrome value memory 211.

The dimension 1 syndrome value memory 211 stores the dimension 1 syndrome value calculated by the dimension syndrome value calculation unit 111. The dimension 1 syndrome value memory 211 outputs the dimension 1 syndrome value to the dimension 1 soft decision input value calculation unit 112.

The dimension 1 soft decision input value calculation unit 112 calculates a dimension 1 soft decision input value (an example of a first soft decision input value) using a dimension 1 syndrome value input from the dimension 1 syndrome value memory 211, correction information input from the dimension 1 correction information memory 212, and reliability information input from the reliability information memory 231. Details of a method of calculating the dimension 1 soft decision input value by the dimension 1 soft decision input value calculation unit 112 will be described later. The dimension 1 soft decision input value calculation unit 112 outputs the dimension 1 soft decision input value to the dimension 1 SISO decoding unit 113.

The dimension 1 correction information memory 212 is a memory that stores correction information of the component code of dimension 1 (dimension 1 correction information, an example of first correction information). Similarly, the dimension 2 correction information memory 222 is a memory that stores correction information (dimensional 2 correction information, an example of second correction information) of a dimension 2 component code (an example of a second component code).

The correction information includes information indicating a position corrected by the decoding processing (corrected position) and information indicating a difference between values. The corrected position indicates, for example, a position where a value differs between a decoded word found by the decoding processing and read data (hard bit data). When a symbol is an element of a binary field, information indicating a difference between values can be omitted. This is because, in the case of a binary field, "a different value" is limited to "a bit being reversed". In the case of a binary field, a corrected position can also be interpreted as a position where a bit is corrected (corrected bit position).

In the present embodiment in which a symbol is an element of a binary field, dimension 1 correction information indicates a position at which a value differs between a MAP decoded word found by decoding processing of a dimension 1 and decoding processing of a dimension 2 for a component code of the dimension 1 and hard bit data stored in the read information memory 201. Similarly, dimension 2 correction information indicates a position at which a value differs between a MAP decoded word found by decoding processing of a dimension 1 and decoding processing of a dimension 2 for a component code of the dimension 2 and hard bit data stored in the read information memory 201.

A method of setting an address (dimension 1 address) used to indicate a position by the dimension 1 correction information may be different from a method of setting an address (dimension 2 address) used to indicate a position by the dimension 2 correction information. For example, the dimension 1 address may be set such that the dimension 1 soft decision input value calculation unit 112 can read the dimension 1 correction information more rapidly. Similarly, the dimension 2 address may be set such that the dimension 2 soft decision input value calculation unit 122 can read the dimension 2 correction information more rapidly. An address that is common to the dimension 1 address and the dimension 2 address may be used. In this case, one correction information memory that is common to the dimension 1 correction information memory 212 and the dimension 2 correction information memory 222 may be used.

The size of the dimension 1 correction information stored in the dimension 1 correction information memory 212 may be set in any manner. In the present embodiment, the size of the dimension 1 correction information is set to a fixed value (for example, 15 bits). The number of pieces of dimension 1 correction information (the number of pieces of correction information) for each component code may be a fixed value, or may be determined in accordance with the number of component codes.

Correction information for each dimension may further include an error flag and other dimension error flag. The error flag is information indicating whether a bit corresponding to the correction information is determined to be an error in a dimension corresponding to the correction information. The other dimension error flag is information indicating whether a bit corresponding to the correction information is determined to be an error in a dimension (the other dimension) other than the dimension corresponding to the correction information.

For example, the dimension 1 correction information may include an error flag indicating whether it is determined to be an error in the dimension 1, and another dimension error flag indicating whether it is determined to be an error in the dimension 2.

The dimension 1 syndrome value memory 211 may store a syndrome value that is corrected to correspond to a "syndrome value calculated from a hard decision value of a soft decision input value". In such a configuration, the correction information may further include a reversal flag. The reversal flag is information indicating whether the sign of the soft decision input value is reversed in the dimension corresponding to the correction information. Whether the sign of the soft decision input value is reversed can be expressed as whether the sign of the soft decision input value is opposite to the sign of a channel value.

The reliability information memory 231 is a memory that stores reliability information. The reliability information is information representing the probability of SISO decoding (decoding reliability) of each component code. The reliability information memory 231 stores reliability information for each component code. For example, the reliability information memory 231 stores reliability information of a component code of a dimension 1 (an example of first reliability information) and reliability information of a component code of a dimension 2 (an example of second reliability information).

The reliability information is, for example, a metric that is calculated from a soft decision input value (=probability information) and indicates whether the probability of the code word c being an original component code word is high or low. For example, as reliability information in a binary code, a likelihood calculated from a soft decision input value S for a code word c may be used. The reliability information is not limited thereto, and for example, the following information may be used.

(I1) A probability value that the codeword c is correct (I2) A value of a distance function between the code word c and the soft decision input value S (I3) A value obtained by applying a logarithmic function or the like to the value described in (I1) or (I2) above The dimension 1 SISO decoding unit 113 performs SISO decoding using the dimension 1 soft decision input value input from the dimension 1 soft decision input value calculation unit 112 to obtain correction information (corrected bit position) and reliability information of SISO decoding. The dimension 1 SISO decoding unit 113 outputs the correction information (corrected bit position) to the dimension 1 correction information memory 212 and the dimension 2 correction information memory 222, and outputs the reliability information to the reliability information memory 231.

The dimension 1 SISO decoding unit 113 represents the correction information (corrected bit position) to be output to the dimension 1 correction information memory 212 and the dimension 2 correction information memory 222 by an address (the dimension 1 address or the dimension 2 address) used in each of the memories and outputs the correction information to the corresponding memory out of the dimension 1 correction information memory 212 and the dimension 2 correction information memory 222.

As described above, the processing for the component code of the dimension 1 is realized using the dimension 1 syndrome value calculation unit 111, the dimension 1 syndrome value memory 211, the dimension 1 soft decision input value calculation unit 112, the dimension 1 SISO decoding unit 113, the dimension 1 correction information memory 212, the reliability 2 information memory 231, and the dimension correction information memory 222.

Processing for a component code of the dimension 2 is equal to the processing for the component code of the dimension 1 when the "dimension 1" and the "dimension 2" are exchanged, and thus a detailed description thereof will be omitted. For example, each unit used in the processing for the component code of the dimension 1 corresponds to each unit used in the processing for the component code of the dimension 2 as follows.

Dimension 1 syndrome value calculation unit 111: Dimension 2 syndrome value calculation unit 121

Dimension 1 syndrome value memory 211: Dimension 2 syndrome value memory 221

Dimension 1 soft decision input value calculation unit 112: Dimension 2 soft decision input value calculation unit 122

Dimension 1 SISO decoding unit 113: Dimension 2 SISO decoding unit 123

Dimension 1 correction information memory 212: Dimension 2 correction information memory 222

The reliability information memory 231 is used in the processing for the component code of the dimension 1 and the processing for the component code of the dimension 2 in common.

In the following, when the dimensions are not distinguished from each other, the memories may be represented as follows.

Dimension 1 syndrome value memory 211, dimension 2 syndrome value memory 221: SMEM Dimension 1 correction information memory 212, dimension 2 correction information memory 222: FMEM When turbo decoding performed by the SISO decoding unit 182 is not successful, the cancellation processing unit 241 executes cancellation processing for returning a maximum likelihood decoded word that satisfies predetermined conditions among a plurality of decoding results (hereinafter also referred to as maximum likelihood decoded words) obtained for each of a plurality of component codes to a value before decoding. The plurality of maximum likelihood decoded words are equivalent to decoding results respectively corresponding to a plurality of elements provided in read information (received words). When a product code is used as an error correction code, a plurality of elements are equivalent to, for example, a plurality of component codes of the product code.

In turbo decoding, correction information indicating an error position found during decoding of each component code is stored in the FMEM (dimensional 1 correction information memory 212, dimension 2 correction information memory 222). Then, it is finally determined whether to perform bit reversal (error correction) using the stored correction information and the reliability of the maximum likelihood decoded word. The cancellation processing is equivalent to processing for deleting the correction information stored in the FMEM. Deleting the correction information corresponds to returning to a state where no error is found at an error position indicated by the correction information, in other words, returning the maximum likelihood decoded word to the value before decoding.

Figure 9:
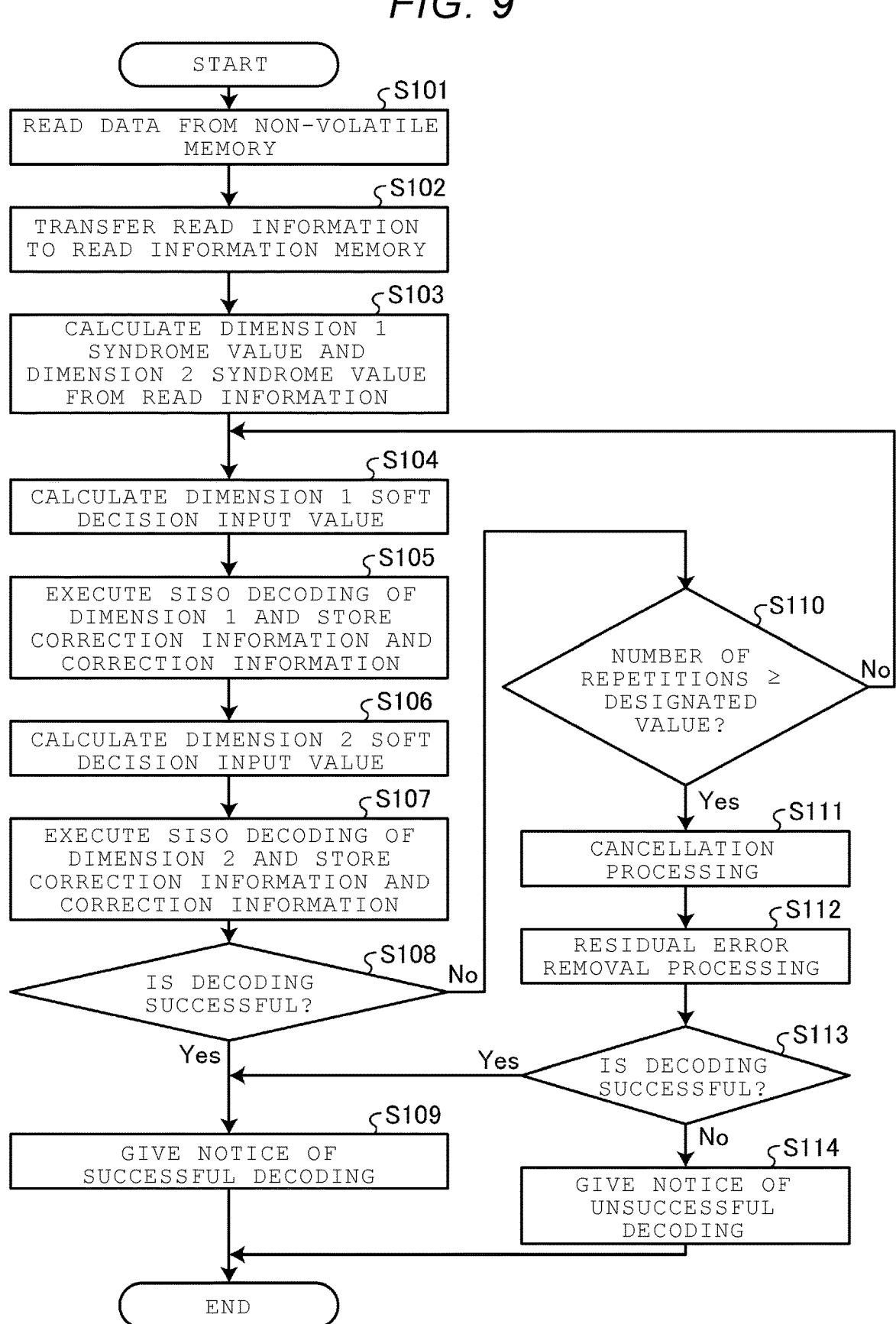
FIG. 9 is a flowchart of decoding processing performed by the memory system according to the first embodiment.

FIG. 9 is a flowchart showing an example of decoding processing performed by the memory system according to the present embodiment. FIG. 9 shows an example of decoding processing for a two-dimensional error correction code.

The control unit 11 reads an error correction code from the non-volatile memory 20 and obtains read information (step S101). The control unit 11 transfers the read information which is read to the read information memory 201 and stores it (step S102).

The dimension 1 syndrome value calculation unit 111 and the dimension 2 syndrome value calculation unit 121 calculate a dimension 1 syndrome value and a dimension 2 syndrome value, respectively, from the read information (hard bit data) (step S103). For example, the dimension 1 syndrome value calculation unit 111 reads the hard bit data stored in the read information memory 201, calculates the dimension 1 syndrome value using the read hard bit data, and stores the dimension 1 syndrome value in the dimension 1 syndrome value memory 211. The dimension 2 syndrome value calculation unit 121 reads the hard bit data stored in the read information memory 201, calculates the dimension 2 syndrome value using the read hard bit data, and stores the dimension 2 syndrome value in the dimension 2 syndrome value memory 221.

Next, decoding processing of a component code of a dimension 1 is executed. The following steps S104 and S105 are executed for each of a plurality of dimension 1 component codes.

First, the dimension 1 soft decision input value calculation unit 112 calculates a dimension 1 soft decision input value using the calculated dimension 1 syndrome value, correction information input from the dimension 1 correction information memory 212, and reliability information input from the reliability information memory 231 (step S104).

An example of a method of calculating a soft decision input value will be described below. Hereinafter, an example of a method of calculating a soft decision input value for a component code of a dimension 1 (dimension 1 soft decision input value) will be described, and the same procedure may also be applied to the calculation (step S106) of a soft decision input value for a component code of a dimension 2 (dimension 2 soft decision input value).

The dimension 1 soft decision input value calculation unit 112 reads a dimension 1 syndrome value s from the dimension 1 syndrome value memory 211 and substitutes the dimension 1 syndrome value s into a variable x.

The dimension 1 soft decision input value calculation unit 112 reads correction information from the dimension 1 correction information memory 212. Among the pieces of read correction information, pieces of correction information found in the other dimension (dimension 2) are assumed to be $a_1$, $a_2$, . . . , and $a_m$. The values of $a_1$, $a_2$, . . . , and $a_m$ indicate bit positions in the component code of the dimension 1. That is, the correction information indicates that a bit is reversed at each position indicated by the correction information.

The dimension 1 soft decision input value calculation unit 112 reads pieces of reliability information $pr_1$, $pr_2$, . . . , and $pr_m$ corresponding to $a_1$, $a_2$, . . . , and $a_m$ from the reliability information memory 231.

The dimension 1 soft decision input value calculation unit 112 performs the following calculation for a position $a_i$ (i=1, 2, . . . , and m):

(C1) An external value ei is obtained from pri.

(C2) $\sigma_i = \lambda_i + ei$ is obtained. When $\lambda_i \sigma_i < 0i$, a variable x is rewritten to the value of $x + Hx_i$. $\lambda i$ indicates a function of hard bit data that is read. H indicates a parity check matrix of a component code of a dimension 1. $x_i$ indicates a vector in which only a component corresponding to the position $a_i$ is 1 and the other components are 0.

The dimension 1 soft decision input value calculation unit 112 sets the finally obtained value of the variable x (that is, a value obtained by the rewriting of (C2) described above starting from the dimension 1 syndrome value s) to s'. The dimension 1 soft decision input value calculation unit 112 outputs s', $\sigma_1$, $\sigma_2$, . . . , and $\sigma_m$, $a_1$, $a_2$, . . . , and $a_m$ as soft decision input values.

The above-described method is a procedure of obtaining s' by updating the dimension 1 syndrome value s read from the dimension 1 syndrome value memory 211 by using the information $a_1$, $a_2$, . . . , $a_m$, $pr_1$, $pr_2$, . . . , and $pr_m$ obtained when the dimension 1 syndrome value s is read. As a modification example of this method, a procedure may be used in which s' is obtained by updating the dimension 1 syndrome value s at a point in time when $a_1$, $a_2$, . . . , $a_m$, $pr_1$, $pr_2$, . . . , and $pr_m$ are obtained (step S105 to be described later), and s' is stored in the dimension 1 syndrome value memory 211. In this case, it is not necessary to update the value s' read from the dimension 1 syndrome value memory 211 in step S104.

Step S105 will be described. The dimension 1 SISO decoding unit 113 performs SISO decoding of a dimension 1, stores correction information indicating a correction bit position in the dimension 1 correction information memory 212 and the dimension 2 correction information memory 222, and also stores reliability information obtained as a result of the SISO decoding in the reliability information memory 231 (step S105).

An example of SISO decoding will be described below. The following example is an example of SISO decoding using an example of the above-described soft decision input value. Although an example of SISO decoding for a component code of a dimension 1 will be described below, the same procedure can also be applied to a component code of a dimension 2.

The dimension 1 SISO decoding unit 113 may be configured to execute any one of SISO decoding processes to be described below, or may be configured to switch between a plurality of types of SISO decoding and execute the SISO decoding. For example, the dimension 1 SISO decoding unit 113 may execute SISO decoding selected from among the plurality of types of SISO decoding in accordance with a decoding situation.

Example 1 of SISO Decoding: Bounded Distance Decoding

The dimension 1 SISO decoding unit 113 obtains a corrected bit position and reliability information by decoding using s' according to the following procedure.

(E1-1) Bounded distance decoding of a component code of a dimension 1 is performed using s' to obtain a corrected bit position e (this decoding method is referred to as syndrome decoding).

(E1-2) Reliability information pr of a decoding result of the component code of the dimension 1 is obtained from the corrected bit position e and the reliability information stored in the reliability information memory 231.

(E1-3) The corrected bit position e and the reliability information pr are output.

Example 2 of SISO Decoding: Method to which Chase Decoding is Applied

The dimension 1 SISO decoding unit 113 obtains a corrected bit position and reliability information by decoding using s', $\sigma_1$, $\sigma_2$, . . . , $\sigma_m$, $a_1$, $a_2$, . . . , and $a_m$ according to the following procedure.

(E2-1) $\sigma_1$, $\sigma_2$, . . . , and $\sigma_m$ are sorted in ascending order of an absolute value. $a_1$, $a_2$, . . . , and $a_m$ are also rearranged such that the subscripts thereof correspond to those of $\sigma_1$, $\sigma_2$, . . . , and $\sigma_m$. The sorting may be performed approximately. Hereinafter, $\sigma_1$, $\sigma_2$, . . . , and $\sigma_m$, $a_1$, $a_2$, . . . , and $a_m$ will be values after the sorting processing.

(E2-2) f pieces are selected from among $a_1$, $a_2$, . . . , and at with t and f ($t \leq m$ and $f \leq t$) being any constants. The following processing (E2-2-1) is performed for each of $_t C_f$ selection combinations.

(E2-2-1) A syndrome value s'' obtained by reversing a bit at a selected position is calculated from s' (the same calculation as (C2) in step S104). Then, syndrome decoding is performed using s'' to obtain a corrected bit position e. Furthermore, reliability information pr of the component code of the dimension 1 is obtained from the corrected bit position e, f reversal positions, and the reliability information stored in the reliability information memory 231.

(E2-3) Among sets of corrected bit positions and reliability information obtained for each of the $_rC_f$ selection combinations, a set with the maximum reliability information is assumed to be (e^, pr^).

(E2-4) The corrected bit position e^ and the reliability information pr^ are output.

Description returns to the flowchart of FIG. 9. Next, decoding processing of a component code of a dimension 2 is executed. The following steps S106 and S107 are executed for each of a plurality of component codes of the dimension 2.

First, the dimension 2 soft decision input value calculation unit 122 calculates a dimension 2 soft decision input value (an example of a second soft decision input value) using the calculated dimension 2 syndrome value, the correction information input from the dimension 2 correction information memory 222, and the reliability information input from the reliability information memory 231 (step S106). Step S106 can be executed by the same procedure as step S104.

The dimension 2 soft decision input value calculation unit 122 performs SISO decoding of the dimension 2, stores correction information indicating a correction bit position in the dimension 1 correction information memory 212 and the dimension 2 correction information memory 222, and stores reliability information obtained as a result of the SISO decoding in the reliability information memory 231 (step S107). Step S107 can be executed by the same procedure as step S105.

Next, the decoder 18 determines whether the decoding is successful (step S108). Successful decoding may mean, for example, that a decoded word that can be determined to be correct is found.

On the other hand, when the decoding is not successful (NO in step S108), the decoder 18 determines whether the number of repetitions of this operation reaches a preset designated value (step S110). When the number of repetitions of this operation does not reach the designated value (NO in step S110), the decoder 18 increases the number of repetitions of this operation by 1, returns to step S104, and executes the subsequent operations. The number of repetitions of this operation may be, for example, the number of times the operations of steps S104 to S107 are repeated.

When the decoding is successful (YES in step S108), the decoder 18 notifies an external control unit or the like of the success in the decoding and a decoded word (step S109), and terminates the decoding processing. The decoder 18 corrects hard bit data written to the read information memory 201 using, for example, information stored in the reliability information memory 231, the dimension 1 correction information memory 212, and the dimension 2 correction information memory 222 and obtained by the decoding processing. The decoder 18 outputs the corrected hard bit data as a final output (output decoded word).

For example, the decoder 18 calculates a logarithmic posterior probability ratio for each bit of the hard bit data in the read information memory 201 by using the above-described Equation (1). The decoder 18 determines whether to correct the hard bit data, which corresponds to each bit, stored in the read information memory 201, depending on whether the calculated logarithmic posterior probability ratio has a positive value or a negative value. The decoder 18 corrects the hard bit data as determined and outputs the hard bit data as an output decoded word.

When the number of repetitions reaches the designated value (YES in step S110), the decoder 18 (the cancellation processing unit 241 in the SISO decoding unit 182) executes cancellation processing (step S111). The cancellation processing includes processing for correcting the hard bit data written to the read information memory 201 using information in the FMEM (the dimension 1 correction information memory 212, the dimension 2 correction information memory 222) after the cancellation (after the correction information is deleted) and generating an output decoded word.

After the cancellation processing, the decoder 18 (residual error removal unit 183) executes residual error removal processing (step S112). The residual error removal processing is executed on the output decoded word generated by the cancellation processing.

The decoder 18 determines whether decoding according to the residual error removal processing is successful (step S113). When the decoding is not successful (NO in step S113), the decoder 18 notifies an external control unit or the like of a failure in the decoding (step S114), and terminates the decoding processing. When the decoding is successful (YES in step S113), the decoder 18 notifies the external control unit or the like of the successful decoding and a decoded word (step S109), and terminates the decoding processing.

In the example of FIG. 9, the hard bit data stored in the read information memory 201 is collectively corrected in step S109. A method of correcting the hard bit data is not limited thereto, and for example, a method of correcting the hard bit data every time immediately after each repeated SISO decoding may be used. In this case, the correction processing in step S109 is not necessary, and the hard bit data stored in the read information memory 201 at a point in time when the processing reaches step S109 may be output as a final output (output decoded word).

Although an example of decoding processing using a two-dimensional error correction code is described so far, the same procedure may also be applied to a multidimensional (N-dimensional) error correction code as described above. For example, an a-th component code ($1 \le a \le ni$, ni is the number of component codes of an i-th dimension) of the i-th dimension ($1 \le i \le N$) among N dimensions is set to be an a-th component code, and correction information, reliability information, and a soft decision input value for the a-th component code are set to be a-th correction information, a-th reliability information, and an a-th soft decision input value, respectively.

In this case, the decoder 18 calculates the a-th soft decision input value for the i-th component code based on the a-th correction information, the a-th reliability information, and a syndrome value of the a-th component code. The decoder 18 inputs the a-th soft decision input value to execute decoding processing of the a-th component code, thereby calculating a decoded word of the a-th component code, the a-th correction information, and the a-th reliability information. The decoder 18 stores b-th correction information indicating a corrected position of a b-th component code ($j \ne i$, $1 \le j \le N$, b is an index of a component code of a j-th dimension) which is corrected by the calculated a-th correction information and the decoding processing of the a-th component code in the correction information memory, and stores the a-th reliability information in the reliability information memory.

Next, details of cancellation processing will be described. As described above, the cancellation processing is processing for returning a maximum likelihood decoded word satisfying predetermined conditions among a plurality of maximum likelihood decoded words to a value before decoding when turbo decoding is not successful. As the conditions, for example, the following conditions R1 to R3 may be used.

Condition R1: a reliability (decoding reliability) indicated by reliability information of a component code is less than a threshold value (first threshold value).

Condition R2: A hamming distance between a received value and the maximum likelihood decoded word is equal to or greater than a threshold value (second threshold value).

Condition R3: When cancellation processing is executed, the number of component codes provided in a component code group of another dimension (hereinafter referred to as the other dimension) that changes from the state of successful decoding to the state of unsuccessful decoding is equal to or less than a threshold value (third threshold value).

Figure 10:
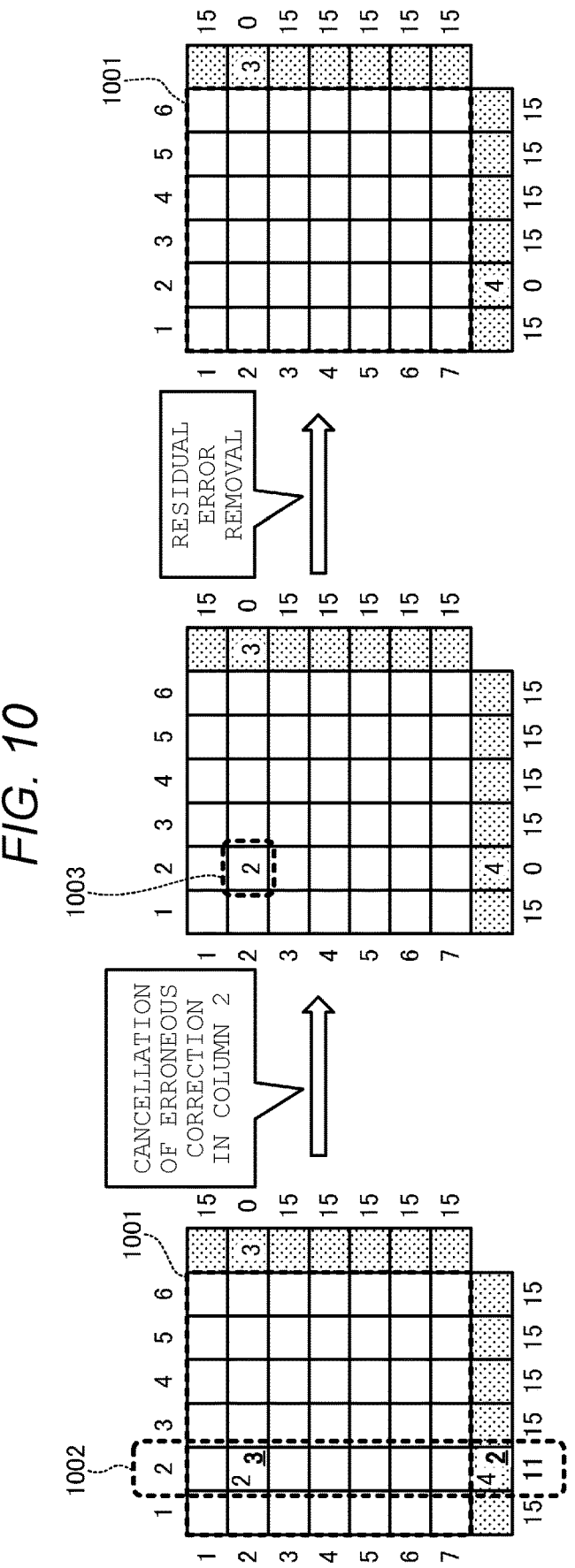
FIG. 10 is a diagram showing cancellation processing.

Details of each of the conditions will be described below. FIG. 10 is a diagram showing cancellation processing based on the condition R1. Similarly to FIG. 6, FIG. 10 shows an example in which a product code in which 6 bits (columns 1 to 6) of information bits are encoded in the column direction and 7 bits (rows 1 to 7) of information bits are encoded in the row direction is used.

The condition R1 can be interpreted as a condition for setting a maximum likelihood decoded word for a component code whose reliability does not reach a threshold value to be a target to be canceled. The threshold value may be, for example, a maximum value of reliability. In this case, the condition R1 indicates that a maximum likelihood decoded word for a component code whose reliability does not reach a maximum value is set to be a target to be canceled.

FIG. 10 shows an example in which a threshold value (for example, a maximum value) of reliability is 15. Numerical values (0, 11, or 15 in FIG. 10) on the right of each row and below each column indicate a reliability. A case where reliability=0 indicates that a maximum likelihood decoded word is not found. Thus, a component code whose reliability is 0 is excluded from a target for determination based on the condition R1.

Numerical values that are not underlined in a protection area 1001 indicate the number of errors at the time of reading from the non-volatile memory 20, and underlined numerical values indicate the number of errors further added due to error correction by the decoder 18. For example, a second column 1002 (column 2) corresponds to a row 2 and a parity, and the number of errors is increased due to erroneous correction.

In the cancellation processing using the condition R1, component codes in a column 1002 (column 2) whose reliability is less than a maximum value (11<15) are targets. A central part in FIG. 10 shows the state of a product code after the cancellation processing. By the cancellation processing, errors increased due to erroneous correction are deleted.

In this state, when residual error removal processing using, for example, a 3-bit correctable BCH code is executed, a 2-bit error in the protection area 1001 is corrected, resulting in a success in decoding. A right part in FIG. 10 shows a state where decoding is successful due to residual error removal processing.

Next, cancellation processing based on the condition R2 will be described. The condition R2 indicates that, for a certain component code, a hamming distance between a received value of the component code and a maximum likelihood decoded word obtained by decoding the component code is equal to or greater than a threshold value. The received value of the certain component code represents an element corresponding to the component code among elements provided in read information (received word). The hamming distance between the received value and the maximum likelihood decoded word can be calculated by, for example, the number of errors found by executing bounded distance decoding of the BCH code on the received value.

By using the condition R2, for example, it is possible to cancel erroneous correction whose reliability reaches a maximum value.

Next, cancellation processing based on the condition R3 will be described. The condition R3 can be interpreted as a condition for setting a component code of a certain dimension to be a target to be cancelled when the number of component codes in the other dimension which are set to be in an unsatisfied state is equal to or less than a threshold value due to cancellation processing of the component code of the certain dimension.

"Satisfied" means that a syndrome value is a value (for example, 0) indicating that there is no error, and "Unsatisfied" means that a syndrome value is a value (for example, other than 0) indicating that there is an error.

Figure 11:
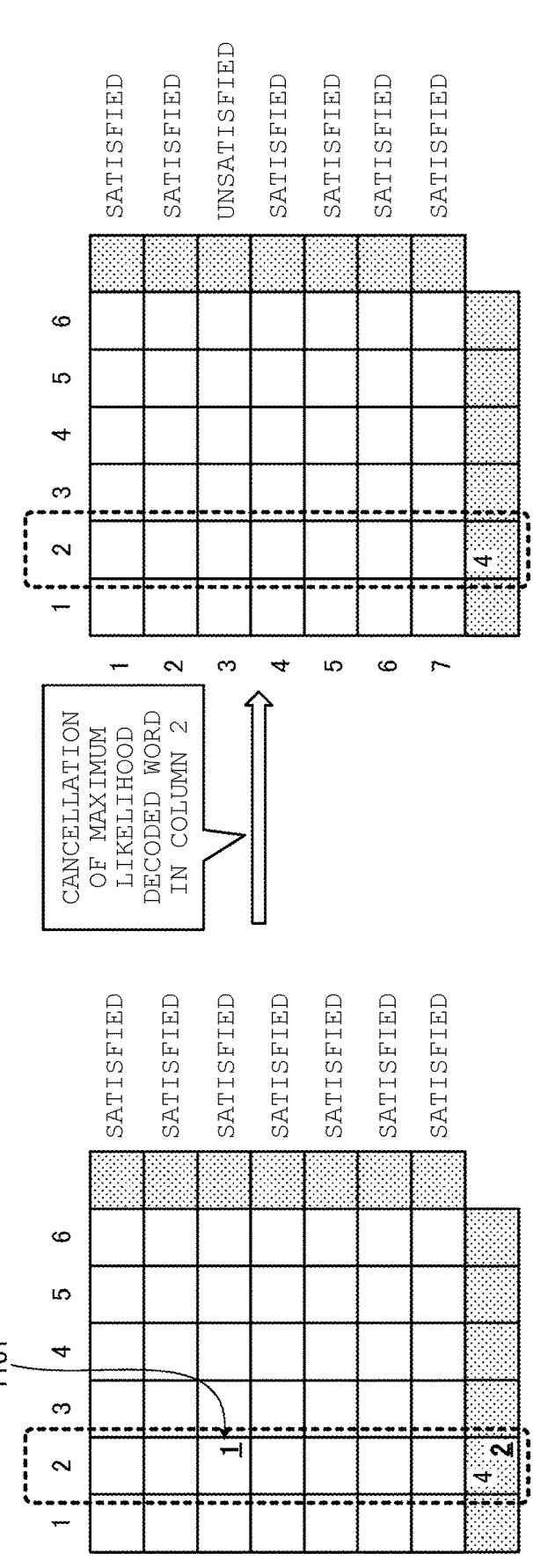
FIG. 11 is a diagram showing an example in which a syndrome value of a component code changes from a satisfied state to an unsatisfied state.

FIG. 11 is a diagram showing an example in which a syndrome value of a component code of the other dimension changes from a satisfied state to an unsatisfied state due to cancellation processing. The number of errors 1101 in FIG. 11 indicates the number of errors (=1) found by decoding processing. In this example, a syndrome value of a component code corresponding to a row 3 is in a satisfied state.

Here, it is assumed that cancellation processing is performed on the component codes in the column 2. In this case, since a maximum likelihood decoded word in the column 2 is canceled, a bit corresponding to an error found in the row 3 is reversed, and syndromes of the component codes (component codes of the other dimension) corresponding to the row 3 are set to be in an unsatisfied state.

Figure 12:
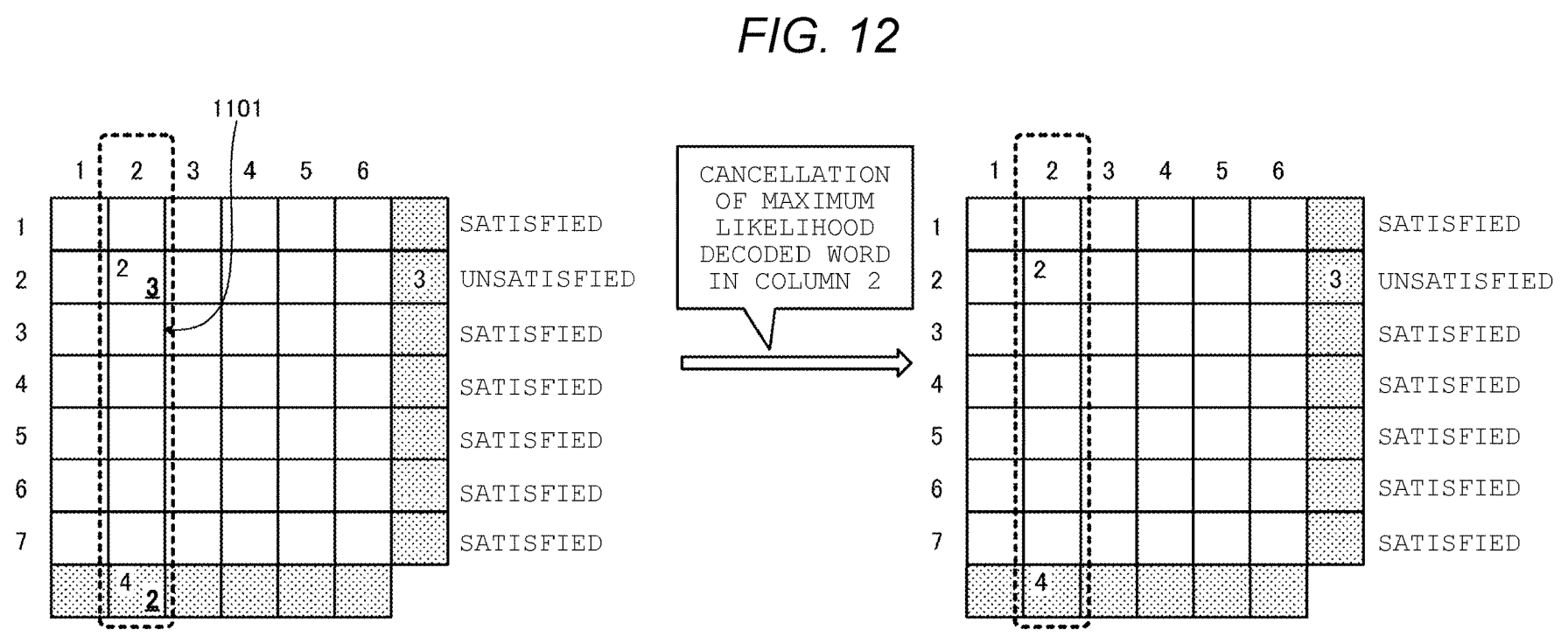

FIG. 12 is a diagram showing an example in which the syndrome values of the component codes of the other dimension remain in an unsatisfied state even when cancellation processing is executed. Similarly to FIG. 10, in FIG. 12, numerical values that are not underlined in the protection area indicate the number of errors at the time of reading from the non-volatile memory 20, and underlined numerical values indicate the number of errors further added by decoding processing.

In the example of FIG. 12, syndrome values of component codes corresponding to the row 2 are in an unsatisfied state. Here, it is assumed that cancellation processing is performed on the component codes in the column 2. In this case, since a maximum likelihood decoded word in the column 2 is canceled, a bit corresponding to an error found in the row 2 is reversed, but the syndromes of the component codes (component codes of the other dimension) corresponding to the row 2 remain in an unsatisfied state and unchanged.

In the condition R3, the number of component codes that change from a satisfied state to an unsatisfied state as shown in FIG. 11 is considered, but the number of component codes that remain in an unsatisfied state and unchanged as shown in FIG. 12 is not considered.

The cancellation processing unit 241 sets all component codes that satisfy the above-described conditions (R1 to R3)

to be targets, and thus the cancellation processing unit 241 may set some component codes among a plurality of component codes that satisfy the conditions to be targets for cancellation processing. For example, the cancellation processing unit 241 may select some component codes from among the plurality of component codes that satisfy the conditions, and may execute processing for executing cancellation processing on the selected component codes a plurality of times. For each cancellation processing, the residual error removal unit 183 executes residual error removal processing using a plurality of decoding results after the cancellation processing is executed.

Although any method may be used as a method of selecting component codes, for example, a method of randomly selecting some component codes from among a plurality of component codes can be applied. The decoder 18 executes cancellation processing on the selected component codes, and when decoding is successful as a result of the execution of residual error removal processing, the decoder 18 may terminate the decoding processing at that point in time.

The cancellation processing may be executed when a condition related to the number of component codes is satisfied. For example, the cancellation processing unit 241 may execute the cancellation processing when the number of component codes whose reliability is equal to or greater than a threshold value (fourth threshold value) is equal to or greater than another threshold value (fifth threshold value).

As described above, the memory system according to the present embodiment executes cancellation processing for returning decoding results that satisfy predetermined conditions among a plurality of decoding results for each of a plurality of component codes to values before decoding, and executes residual error removal processing on the decoding results after the cancellation processing. Thereby, for example, it is possible to cancel a decoding result which is erroneous correction and to improve the accuracy of error correction.

Second Embodiment

In a second embodiment, an example in which an LDPC code is used as an error correction code will be described. In the second embodiment, a configuration of a decoder is different from that in the first embodiment. Functions of a decoder 18-2 according to the second embodiment will be described below.

Figure 13:
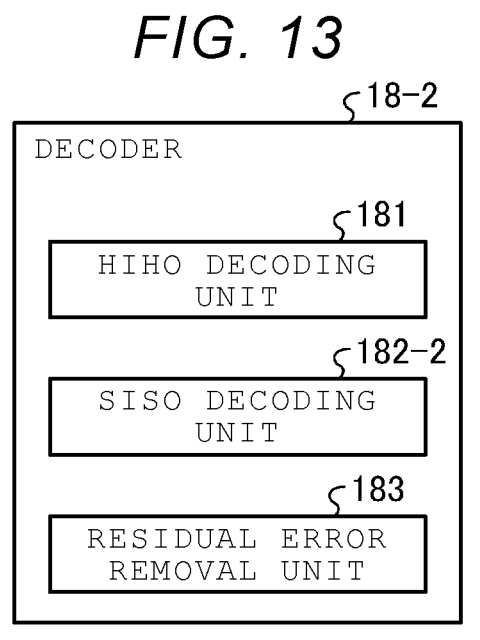

FIG. 13 is a block diagram showing an example of a schematic configuration of the decoder 18-2 according to the second embodiment. The decoder 18-2 includes a HIHO decoding unit 181, a SISO decoding unit 182-2, and a residual error removing unit 183.

In the second embodiment, the function of a SISO decoding unit 182-2 is different from that of the decoder 18 according to the first embodiment. Since the other configurations are the same as those in the first embodiment, the same reference numerals are given thereto, and description thereof will be omitted.

The SISO decoding unit 182-2 decodes an LDPC code. For example, the SISO decoding unit 182-2 decodes the LDPC code by belief propagation (BP, an example of first decoding processing).

In the belief propagation, for example, a Tanner graph including a plurality of variable nodes and a plurality of check nodes is used. The Tanner graph can be interpreted as a graph expressing a rule structure (constraints) that has to be satisfied by a code to be decoded. In the belief propagation, soft decision decoding using, for example, a Tanner graph is executed. For example, a log-likelihood ratio (LLR), which is a logarithmic ratio of a likelihood that a code bit is 0 to a likelihood that a code bit is 1, is used as an input of soft decision decoding.

Each of the plurality of variable nodes corresponds to one bit. The check node represents, for example, a constraint that "decoding results for adjacent variable nodes are an even parity". The even parity means that, for example, an exclusive OR (EXOR) of decoding results for a plurality of adjacent variable nodes is 0. For example, the check node is in a satisfied state when a probability that the constraint is satisfied is higher than a probability that the constraint is not satisfied.

In the soft decision decoding on the Tanner graph, each variable node transmits and receives LLRs to and from other variable nodes via check nodes. Finally, it is determined whether a code bit of each variable node is 0 or 1.

In the decoding of an LDPC code, a plurality of decoding results (hereinafter referred to as posterior values) obtained respectively for a plurality of variable nodes are equivalent to decoding results respectively corresponding to a plurality of elements provided in read information (received word).

The SISO decoding unit 182-2 calculates the reliability of a check node and executes cancellation processing using conditions for the reliability. That is, the SISO decoding unit 182-2 is further equipped with a function equivalent to the cancellation processing unit 241 of the SISO decoding unit 182 according to the first embodiment.

The reliability of the check node is calculated, for example, by "a log-likelihood ratio of a syndrome corresponding to the check node". The log-likelihood ratio of the syndrome corresponding to the check node will be described below. Probability variables for bit values of k variable nodes (k is an integer of 2 or more) adjacent to the check node are assumed to be $b1, b2, \ldots, bk$. A probability $Pr(bi=1)$ that $bi$ ($1 \le i \le k$) is 1 is assumed to be $pi$. A posterior value $Li$ of the variable node is expressed by $Li=\ln((1-pi)/pi)$. At this time, the following Equation (2) is defined as a log-likelihood ratio of a syndrome corresponding to a check node.

$$\ln(Pr(b1 + b2 + \ldots + bk = 0)/Pr(b1 + b2 + \ldots + bk = 1)) \qquad (2)$$

In means a logarithm. In the fractional part, the numerator means "a probability that the check node is in a satisfied state", and the denominator means "a probability that the check node is in an unsatisfied state". In this manner, the fractional part in Equation (2) is a ratio of probabilities. When Equation (2) is transformed, the following Equation (3) is obtained.

$$2\tanh\wedge(-1)(\prod (i \in N(j))\tanh(Li/2)) \qquad (3)$$

The SISO decoding unit 182-2 calculates the reliability of the check node using Equation (2) or Equation (3). For example, when the sign of the log-likelihood ratio in Equation (2) is positive, a probability that "decoding results for adjacent variable nodes are an even parity" is higher than a probability that "decoding results for adjacent variable nodes are not an even parity". It means that the larger an absolute value of the log-likelihood ratio, the greater a difference between the probability that "the decoding results for the adjacent variable node are an even parity" and the probability that "the decoding results for the adjacent variable nodes are not an even parity". Thus, a value calculated by Equation (2) or Equation (3) can be used as the reliability of the check node.

The reliability of the check node is not limited to the above, and for example, a minimum value among absolute values of posterior values of a plurality of variable nodes connected to the check node may be used as the reliability of the check node. In this case, it means that the larger the value, the higher the reliability.

When the decoding of the LDPC code is not successful, the SISO decoding unit 182-2 executes cancellation processing using a condition for the reliability of the check node. The condition indicates, for example, that the reliability of a check node connected to a variable node corresponding to a decoding result (posterior value) is less than a threshold value (sixth threshold value). The cancellation processing is, for example, processing for replacing a posterior value satisfying a condition with a received value. In other words, the cancellation processing is processing for replacing a posterior value of a variable node directly connected to a check node whose reliability is less than a threshold value with a received value.

FIG. 14 is a diagram showing an example of cancellation processing in the second embodiment. FIG. 14 shows a state where decoding of an LDPC code using belief propagation is not successful, that is, a state where a check node in an unsatisfied state remains. In FIG. 14, squares represent check nodes, and circles represent variable nodes. FIG. 14 shows an example in which a rightmost check node 1401 is equivalent to a check node whose reliability is less than a threshold value.

"(Received value)–(Posterior value)" indicates that the received value is changed to the posterior value by decoding using belief propagation. A "posterior value hard decision value" represents a hard decision value (0 or 1) corresponding to a posterior value. For example, when a posterior value is positive, a posterior value hard decision value is 0, and when a posterior value is negative, a posterior value hard decision value is 1. A "value after cancellation processing" represents a hard decision value corresponding to a posterior value after being replaced with a received value through the cancellation processing. A "value after residual error removal processing" represents a decoding result after the residual error removal processing is performed on a "value after cancellation processing". In FIG. 14, it is assumed that residual error removal processing that allows 1-bit correction is used.

In the example of FIG. 14, the SISO decoder 182-2 changes posterior values of four variable nodes 1411 to 1414 connected to the check node 1401 to received values, respectively. For example, a posterior value "–3" of the variable node 1411 is changed to a received value "–9". Since a hard decision value corresponding to this received value is "1", it is not changed from the hard decision value "1" corresponding to the posterior value before the change.

On the other hand, a posterior value "–1" of the variable node 1412 is changed to a received value "3". Since a hard decision value corresponding to this received value is "0", it is changed from the hard decision value "1" corresponding to the posterior value before the change.

It is assumed that the hard decision values of the variable nodes 1411 and 1412 are incorrect. In this case, since a posterior value hard decision value before the cancellation processing includes a 2-bit error, the error cannot be removed by residual error removal processing that allows 1-bit correction. On the other hand, since a posterior value hard decision value after the cancellation processing includes a 1-bit error, the error can be removed by the residual error removal processing that allows 1-bit correction.

In the decoding processing according to the second embodiment, for example, decoding using belief propagation for read information read in step S101 is executed instead of steps S102 to S107 equivalent to turbo decoding in the decoding processing (FIG. 9) according to the first embodiment. A flow of the other steps S108 to S114 is the same as that in the first embodiment.

The cancellation processing may be executed when a condition regarding the number of check nodes is satisfied. For example, the SISO decoding unit 182-2 may execute the cancellation processing when the number of check nodes whose reliability is equal to or greater than a threshold value (seventh threshold value) is equal to or greater than another threshold value (eighth threshold value).

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a non-volatile memory configured to store an error correction code; and
   a memory controller configured to
      obtain read information having a plurality of read elements from the non-volatile memory,
      perform a first decoding process on the read information to output a plurality of decoding results respectively corresponding to the plurality of elements,
      perform a cancellation process for returning the decoding results satisfying a condition among the plurality of decoding results to values by deleting correction information indicating an error position calculated through the error correction code, prior to decoding in response to the first decoding process being not successful, and
      perform, after performing the cancellation process, a second decoding process using the plurality of decoding results,
   wherein the error correction code is an N-dimensional error correction code in which at least one symbol among symbols of a code is protected by N component code groups (N is an integer of 2 or more),
   the plurality of elements are M component codes ($1 \leq i \leq N$, where ni is the number of component codes provided in a component code group of an i-th dimension, and Mis the sum of ni), and
   the first decoding process includes decoding the M component codes and outputting the reliability of each of the plurality of decoding results respectively corresponding to the plurality of component codes, and
   wherein the memory controller is further configured to execute the cancellation process when the number of component codes whose reliability is equal to or higher than a fourth threshold value is equal to or greater than a fifth threshold value.

2. The memory system according to claim 1, wherein the memory controller is configured to perform the first decoding process on the read information and output the plurality of decoding results and reliability of each of the plurality of decoding results, and the condition indicates that the reliability is less than a first threshold value.

3. The memory system according to claim 1, wherein the condition indicates that a distance to each of the plurality of corresponding elements is equal to or greater than a second threshold value.

4. The memory system according to claim 1, wherein the error correction code is an N-dimensional error correction code in which at least one symbol among symbols of a code is protected by N component code groups (N is an integer of 2 or more), the plurality of elements are M component codes ($1 \leq i \leq N$, where ni is the number of component codes provided in a component code group of an i-th dimension, and Mis the sum of ni), the first decoding process includes decoding the M component codes, and the condition provides an indication that, when performing the cancellation process, the number of component codes provided in a component code group of another dimension that changes from a state of successful decoding to a state of unsuccessful decoding is equal to or less than a third threshold value.

5. The memory system according to claim 1, wherein the memory controller is configured to select a subset of the decoding results from the plurality of decoding results that satisfy the condition, perform the cancelation process on the subset of decoding results, and perform the second decoding process a plurality of times by using the plurality of decoding results after performing the cancelation process.

6. The memory system according to claim 1, wherein the error correction code is a low density parity check code (LDPC), the first decoding process includes decoding the read information using belief propagation, and outputting a log-likelihood ratio of a syndrome corresponding to a check node used in the belief propagation or a minimum value among absolute values of decoding results for a plurality of variable nodes connected to the check node as the reliability of the check node, and the condition provides an indication that the reliability of the check node connected to the variable node corresponding to the decoding result is less than a sixth threshold value.

7. The memory system according to claim 6, wherein the memory controller is configured to execute the cancellation process when the number of check nodes whose reliability is equal to or higher than a seventh threshold value is equal to or greater than an eighth threshold value.

8. The memory system according to claim 1, wherein the error correction code is a Bose-Chandhuri-Hocquenghem (BCH) code, and the second decoding process is bounded distance decoding for the BCH code.

9. The memory system according to claim 1, wherein the error correction code is an N-dimensional error correction code in which at least one symbol among symbols of a code is protected by N component code groups (N is an integer of 2 or more), and the second decoding process is iterative decoding for M component codes ($1 \leq i \leq N$, where ni is the number of component codes included in a component code group of an i-th dimension, and M is the sum of ni).

10. A control method performed by a memory controller that controls a non-volatile memory that stores an error correction code, the control method comprising:

obtaining read information having a plurality of elements from the non-volatile memory;

performing a first decoding process on the read information to output a plurality of decoding results respectively corresponding to the plurality of elements included in the read information, performing a cancellation process for returning the decoding results satisfying a predetermined condition among the plurality of decoding results to values by deleting correction information indicating an error position calculated through the error correction code before the decoding in response to the first decoding process being not successful; and performing, after performing the cancelation process, a second decoding process using the plurality of decoding results;

wherein the error correction code is an N-dimensional error correction code in which at least one symbol among symbols of a code is protected by N component code groups (N is an integer of 2 or more), the plurality of elements are M component codes ($1 \leq i \leq N$, where ni is the number of component codes provided in a component code group of an i-th dimension, and Mis the sum of ni), and the first decoding process includes decoding the M component codes and outputting the reliability of each of the plurality of decoding results respectively corresponding to the plurality of component codes.

11. The method according to claim 10, further comprising:

performing the first decoding process on the read information and outputting the plurality of decoding results and reliability of each of the plurality of decoding results, wherein the condition indicates that the reliability is less than a first threshold value.

12. The method according to claim 10, wherein the condition indicates that a distance to each of the plurality of corresponding elements is equal to or greater than a second threshold value.

* * * * *